Dec. 20, 1955         R. WHEELER         2,727,252
           SPORTSMAN CAR TOP SLEEPER
Filed June 14, 1951                    2 Sheets-Sheet 1
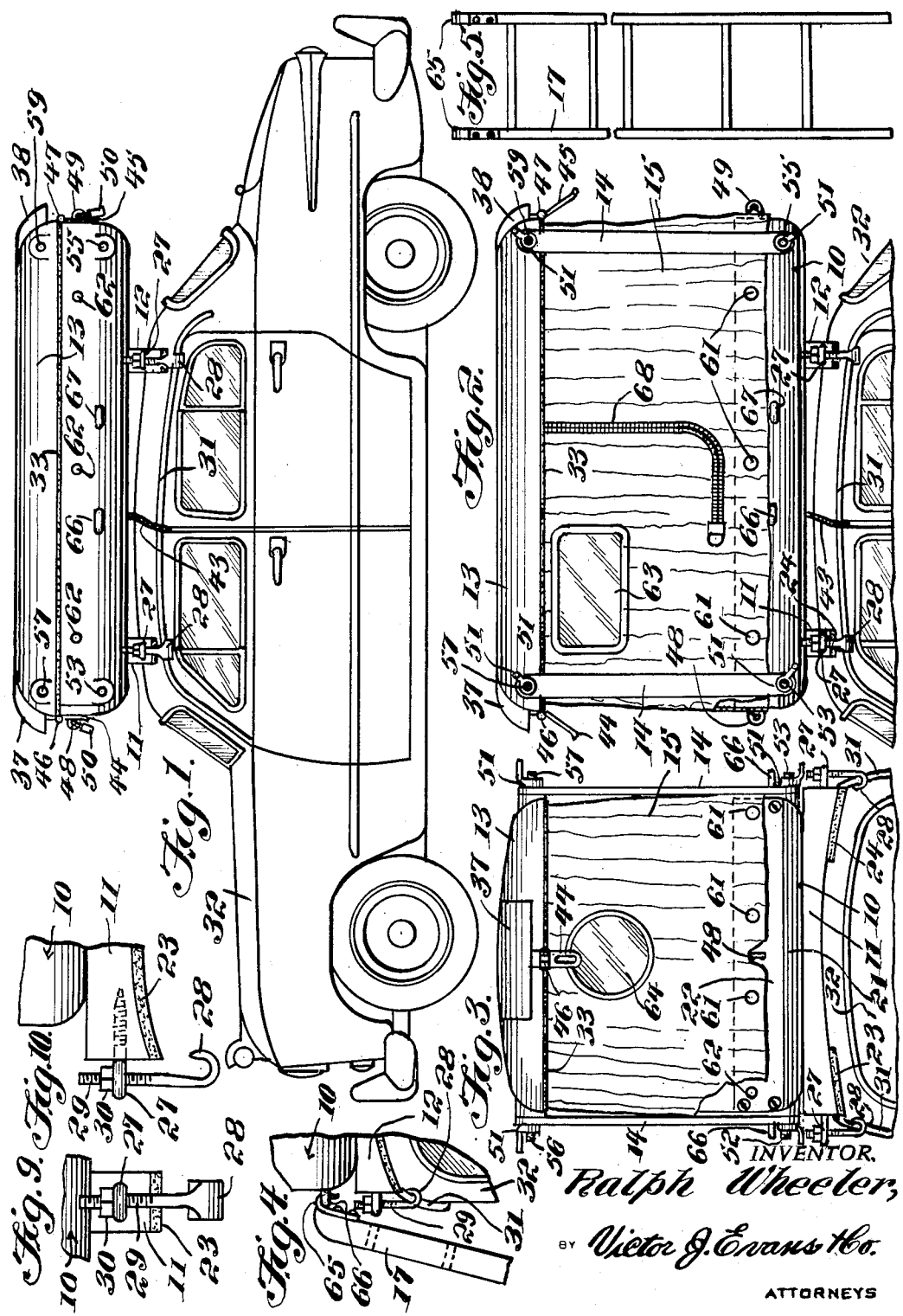
INVENTOR.
Ralph Wheeler,
BY Victor J. Evans & Co.
ATTORNEYS Dec. 20, 1955　　　R. WHEELER　　　2,727,252
SPORTSMAN CAR TOP SLEEPER
Filed June 14, 1951　　　2 Sheets-Sheet 2
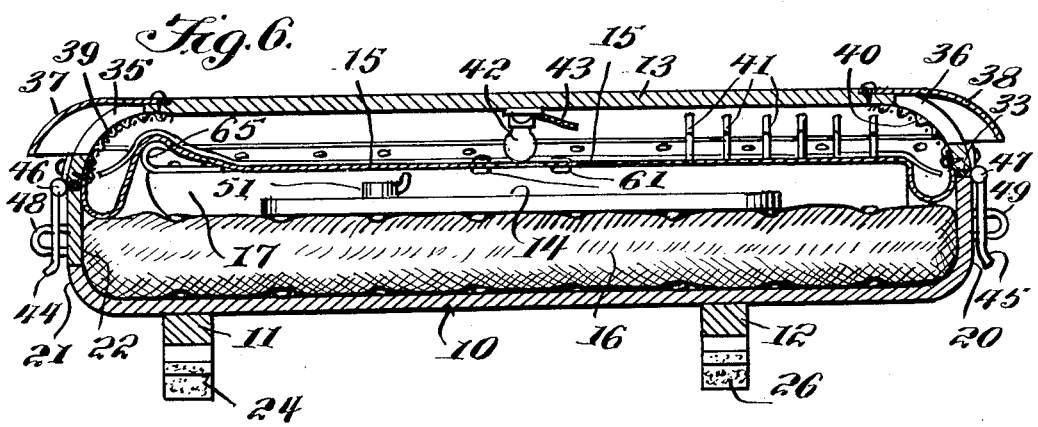
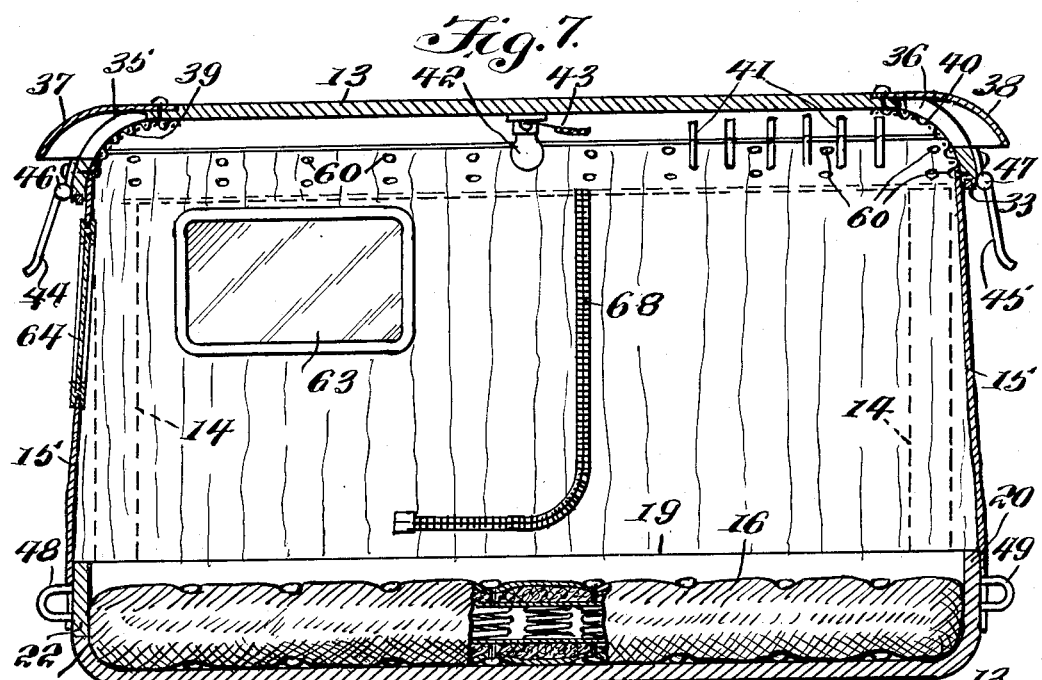
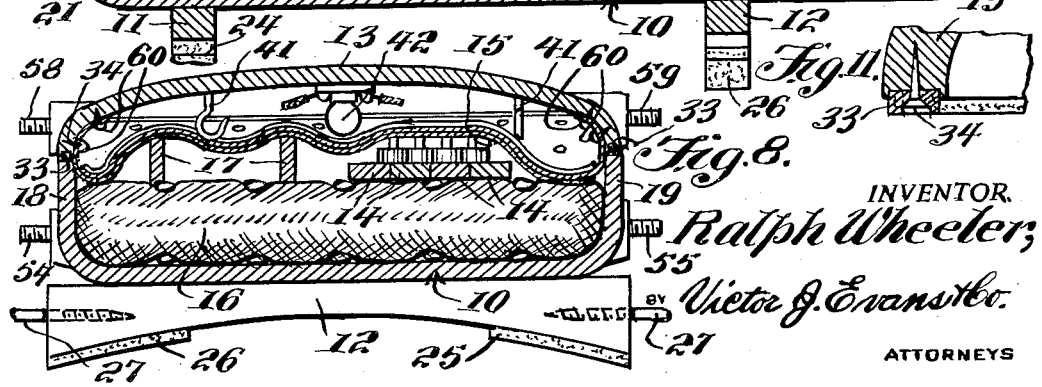
INVENTOR.
Ralph Wheeler,
BY Victor J. Evans & Co.
ATTORNEYS

United States Patent Office 2,727,252
Patented Dec. 20, 1955

2,727,252

SPORTSMAN CAR TOP SLEEPER

Ralph Wheeler, Medina, N. Y.

Application June 14, 1951, Serial No. 231,586

1 Claim. (Cl. 5—119)

This invention relates to sleeping compartments carried by or used in combination with motor vehicles particularly of the pleasure type, and in particular a bed having a mattress in a lower section that is mounted by clamps on the top of a motor vehicle and a cover for the bed with supporting elements adapted to support the cover above the bed and curtains positioned to enclose the area between the cover and bed.

The purpose of this invention is to provide a car top bed whereby sportsmen and other travelers may readily set up a bed on the top of a motor vehicle so that a comfortable bed is available at all times.

Various attempts have been made to combine sleeping compartments with motor vehicles and trailers, however, where beds are provided on tops of motor vehicles they are too cumbersome for universal traveling and in most cases, considerable time is required for setting up the overhead structure. With this thought in mind this invention contemplates a comparatively hollow base with a mattress therein and a cover that fits snugly on the base and that may readily be elevated by struts to a position above the base for use. The device also includes a continuous cover or curtain depending from the cover and a ladder carried between the cover and base and adapted to be set up to facilitate climbing into and out of the bed.

The object of this invention is, therefore, to provide a car top bed that may readily be positioned on the top of a motor vehicle and in which it is only necessary to extend a cover to a position above the bed when use of the bed is desired.

Another object of the invention is to provide a car top bed that is adapted to be used in the carrying position on the top of the car.

A further object of the invention is to provide a car top bed which is of a simple and economical construction.

With these and other objects and advantages in view the invention embodies a collapsible bed structure including an elongated tray-like base with clamps for mounting the base on the top of a motor vehicle on the under surface, with sleeping elements in the base, a cover, detachable struts for supporting the cover above the base, curtains depending from the cover and positioned to extend around the base, fasteners for securing the cover to the base, and a ladder adapted to extend from the base to the ground on which the vehicle is positioned.

Other features and advantages of the invention will appear from the following description taken in connection with the drawings wherein:

Figure 1 is a side elevational view of a motor vehicle illustrating a car top bed positioned on the top thereof and showing the bed in the collapsed or folded position.

Figure 2 is a similar view showing the cover suspended above the base by struts in which position the bed is ready for use.

Figure 3 is an end elevational view also showing the bed with the cover extended.

Figure 4 is a detail illustrating eyes for attaching the upper end of the ladder to the base of the bed.

Figure 5 is an elevational view showing the ladder with parts broken away.

Figure 6 is a longitudinal section through the car top bed with the parts collapsed.

Figure 7 is a similar section showing the parts extended for use.

Figure 8 is a cross section through the car top bed showing the parts collapsed as shown in Figure 6.

Figure 9 is a detail showing an end elevational view of one of the clamp screws for mounting the base on the top of a car.

Figure 10 is a side elevational view of the screw shown in Figure 9.

Figure 11 is a detail showing a section through the lower edge of the cover and illustrating a gasket attached to the edge of the cover for sealing the opening between the cover and base.

Referring now to the drawings wherein like reference characters denote corresponding parts the improved car top bed of this invention includes a base 10 with clamp beams 11 and 12 on the under surface, a cover 13, struts 14 for supporting the cover above the base, a continuous curtain 15, a mattress 16, and a ladder 17.

The base 10 is formed with a continuous lower panel and with upwardly extended side walls 18 and 19, a rear wall 20 and a front wall 21 which is provided with a removable panel 22.

The base 10 is secured to the beams 11 and 12 and the lower surfaces of the beams are provided with resilient pads, such as the pads 23 and 24 of the beam 11 and pads 25 and 26 on the beam 12. The ends of the beams 11 and 12 are provided with eyes 27 and hooks 28 with threaded shanks 29 and nuts 30 to engage the eyes as shown in Figures 9 and 10. The hooks 28 are positioned to extend under gutters 31 in the sides of a motor vehicle as indicated by the numeral 32, as shown in Figure 1. It will be understood that hooks or fasteners of other types or designs may be used on the ends of the beams for clamping the beams in position on the car top.

The cover 13 is provided with arcuate side and end walls, the lower edges of which are provided with a continuous gasket 33 that is secured in position by fasteners 34 and the lower edges are positioned to rest upon the edges of the side and end walls of the base with the gasket sealing the opening between the edges of the arcuate walls of the cover and upper edges of the walls of the base.

The cover is provided with ventilating openings 35 and 36 having extending shields 37 and 38, respectively and the inner surfaces of the openings are covered with wire mesh as indicated by the numerals 39 and 40.

A plurality of hooks 41 may be positioned in the inner surface of the cover and a light 42 may also be positioned on the under surface of the cover. The light may be connected to the electric cigarette lighter of the vehicle by an electric cable 43 that may extend downwardly into the body of the vehicle.

The ends of the cover are provided with latches 44 and 45 that are hinged by hinges 46 and 47, respectively to the cover, and these extend over staples or eyes 48 and 49 on the ends of the base whereby the cover may be secured to the base by locks 50, or other fastening devices.

The struts 14 support the cover 13 above the base 10 and, as illustrated in Figures 2 and 3, openings in the ends of the struts are positioned over threaded studs extended from the sides of the cover and base and the struts are secured on the studs by nuts 51.

The base 10 is provided with threaded studs 52 and 53 at the forward end and 54 and 55 at the rear and the cover is provided with threaded studs 56 and 57 on the forward end and 58 and 59 at the rear.

In setting up the bed compartment the latches 44 and 45 are removed from the eyes 48 and 49 and the struts 14 at the forward end are first positioned with the openings over the threaded studs whereby the forward end of the cover is elevated and with this end clamped in position the opposite end is elevated with the struts secured on the threaded studs by the nuts 51.

The curtain 15, which extends continuously around a bed is secured to the inner surface of the cover 13 by snap fasteners, screws, or brads, as indicated by the numeral 60 and the lower edges are provided with snap fastener sections 61 that are positioned to snap over corresponding sections 62 on the base whereby the lower edge of the curtain is held in position on the base.

The curtains on the sides may be provided with windows 63 and a window 64 may also be provided in one or both of the end sections.

Although a mattress of the inner spring type is shown in Figure 7 of the drawing, it will be understood that a mattress of any suitable type or design may be used and blankets or a sleeping bag may be substituted for the mattress or used in combination therewith.

The ladder 17, which is provided with hooks 65, that are positioned to hold the upper end of the ladder in eyes 66 and 67 on the sides of the base, is normally positioned on the mattress in the bed, as shown in Figure 6 and, also as shown in Figure 8, the struts 14 and wing nuts 51 are positioned in the bed when the parts are collapsed.

With the parts arranged in this manner the car top bed is collapsed with the ladder, struts and locking nuts positioned between the base and cover and with the latches 44 and 45 secured over the eyes 48 and 49 by locks or other holding means the bed is readily carried on the top of a car, and when it is desired to use the bed it is readily set up for use as shown in Figures 2, 3 and 7.

The curtains are provided with an opening having a fastener 68 therein.

It will be understood that modifications may be made in the design and arrangement of the parts without departing from the spirit of the invention.

What is claimed is:

A car top bed, comprising a plurality of spaced parallel clamp beams extending transversely across the top of the car, a base supported on said beams and including a continuous lower panel and upwardly extending side walls, a rear wall, a front wall provided with a removable panel, said base being secured to said beams, resilient pads positioned on the lower surface of said beams, eyes on the ends of said beams, hooks having threaded shanks engaging said eyes and adapted to extend under gutters in the sides of a motor vehicle, a cover separate from said base, said cover being provided with arcuate side and end walls, a continuous gasket on the bottom of said cover, fasteners securing said gasket in place and the lower edges of said cover being positioned to rest upon the edges of the side and end walls of the base with the gasket sealing the opening between the edges of the arcuate walls of the cover and upper edges of the walls of the base, said cover being provided with a plurality of ventilating openings, shields extending from said cover, said openings being covered by wire mesh, a light positioned in said cover and adapted to be electrically connected to the electric cigarette lighter of the vehicle, latches for fastening the cover to said base, staples on the ends of said base for engagement with said latches, a plurality of struts for supporting said cover when the cover is in raised position, said struts having openings in the ends thereof, threaded studs extending from said cover and base for engagement with said openings, a continuous curtain extending between said cover and base, securing elements detachably connecting said curtain to said cover, snap fasteners on said curtain for detachably connecting the lower edge of said curtain to said base, a slide fastener in said curtain for obtaining access to the interior of the device, windows arranged in said curtains, a mattress supported on said base, eyes on the sides of said base, and a ladder having hooks thereon for engagement with said last named eyes.

References Cited in the file of this patent

UNITED STATES PATENTS

| | | |
|---|---|---|
| 1,864,047 | Lawhorne | June 21, 1932 |
| 1,871,871 | Woods | Aug. 16, 1932 |
| 2,186,584 | Halvorsen | Jan. 9, 1940 |
| 2,222,636 | Strauss | Nov. 26, 1940 |
| 2,225,993 | Hornberger | Dec. 24, 1940 |
| 2,291,900 | Jimmes | Aug. 4, 1942 |
| 2,496,055 | King | Jan. 31, 1950 |
| 2,530,450 | Cast | Nov. 21, 1950 |
| 2,561,168 | Beckley | July 17, 1951 |
| 2,574,018 | Cotton | Nov. 6, 1951 |
| 2,589,772 | Carter | Mar. 18, 1952 |

FOREIGN PATENTS

| | | |
|---|---|---|
| 776,636 | France | Nov. 8, 1934 |
| 1,007,592 | France | Feb. 6, 1952 |